United States Patent
de Pablos et al.

(10) Patent No.: US 9,931,539 B1
(45) Date of Patent: Apr. 3, 2018

(54) INTEGRATED SYSTEM FOR BOXING AND MARTIAL ARTS-BASED GROUP COMPETITIVE TRAINING AND METHOD OF USE THE SAME

(71) Applicants: Miguel Angel de Pablos, Madrid (ES); Juan Pablo Nebrera, Madrid (ES)

(72) Inventors: Miguel Angel de Pablos, Madrid (ES); Juan Pablo Nebrera, Madrid (ES)

(73) Assignee: BROOKLYN FITBOXING INTERNATIONAL, S.L., Madrid (ES)

( * ) Notice: Subject to any disclaimer, the term of this patent is extended or adjusted under 35 U.S.C. 154(b) by 0 days.

(21) Appl. No.: 15/458,940

(22) Filed: Mar. 14, 2017

(51) Int. Cl.
*A63B 24/00* (2006.01)
*A63B 69/20* (2006.01)
(Continued)

(52) U.S. Cl.
CPC ...... *A63B 24/0084* (2013.01); *A63B 24/0003* (2013.01); *A63B 69/201* (2013.01); *A63B 71/0616* (2013.01); *A63B 71/0622* (2013.01); *A63B 71/0669* (2013.01); *A63B 71/0686* (2013.01); *A63B 71/1225* (2013.01); *A63B 71/145* (2013.01); *A63F 13/218* (2014.09); *A63F 13/798* (2014.09); *A63F 13/816* (2014.09); *H02J 7/0052* (2013.01);
(Continued)

(58) Field of Classification Search
CPC .............. A63B 24/0084; A63B 69/201; A63B 71/0616; A63B 71/145; A63B 71/1225; A63B 71/0622; A63B 71/0686; A63B 71/0669; A63B 2071/1258; A63B 2230/04; A63B 2230/75; A63B 2071/0647; A63B 2071/065; A63B 2071/0625; A63B 2220/62; A63B 2220/40; A63B 2225/50; A63F 13/218; A63F 13/816; A63F 13/798; H02J 7/0052; H02J 2007/0062; H04L 63/083; H04L 63/10; H04W 84/12
See application file for complete search history.

(56) References Cited

U.S. PATENT DOCUMENTS 7,465,257 B1 * 12/2008 Morgan, Jr. ....... A63B 24/0062
   434/257
7,967,731 B2 * 6/2011 Kil .......................... G06Q 30/02
   482/1
(Continued)

*Primary Examiner* — Glenn Richman
(74) *Attorney, Agent, or Firm* — Alberto A. Leon; AleonLaw, P.C.

(57) ABSTRACT

The invention described and claimed in the present application comprises a modular and integrated system for optimal, organized, structured and integral training and competition using boxing and martial arts-based training and conditioning tools, record keeping, integration, displaying and communication components. The purely structural elements of the invention comprise a metal frame, easy to assemble and disassemble, anchored to the floor with engagement means. Impact receiving means Boxing training bags, and other training tools can be mounted to the frame in a pre-determined, pre-structured arrangement and array. The underlying idea is to seek and optimize a global training vision of a single participant or a group of participants in order to improve their training experience and results, and to allow individual to establish training metrics and group competition.

10 Claims, 10 Drawing Sheets

(51) Int. Cl.

| | | |
|---|---|---|
| *A63B 71/06* | (2006.01) | |
| *A63B 71/14* | (2006.01) | |
| *A63B 71/12* | (2006.01) | |
| *A63F 13/218* | (2014.01) | |
| *A63F 13/816* | (2014.01) | |
| *A63F 13/798* | (2014.01) | |
| *H02J 7/00* | (2006.01) | |
| *H04L 29/06* | (2006.01) | |
| *H04W 84/12* | (2009.01) | |

(52) U.S. Cl.
 CPC . *A63B 2071/065* (2013.01); *A63B 2071/0625* (2013.01); *A63B 2071/0647* (2013.01); *A63B 2071/1258* (2013.01); *A63B 2220/40* (2013.01); *A63B 2220/62* (2013.01); *A63B 2225/50* (2013.01); *A63B 2230/04* (2013.01); *A63B 2230/75* (2013.01); *H02J 2007/0062* (2013.01); *H04L 63/083* (2013.01); *H04L 63/10* (2013.01); *H04W 84/12* (2013.01)

(56) References Cited

U.S. PATENT DOCUMENTS

| | | | | |
|---|---|---|---|---|
| 8,021,281 | B2* | 9/2011 | Forsell | A63B 69/004 463/47.1 |
| 8,221,290 | B2* | 7/2012 | Vincent | A63B 24/0021 482/8 |
| 8,360,904 | B2* | 1/2013 | Oleson | A63B 24/0062 463/36 |
| 8,408,910 | B2* | 4/2013 | Holljes | A63F 13/53 434/156 |
| 8,702,430 | B2* | 4/2014 | Dibenedetto | H04M 1/72563 434/247 |
| 2003/0216228 | A1* | 11/2003 | Rast | A63B 21/0087 482/84 |
| 2008/0102424 | A1* | 5/2008 | Holljes | A63B 21/0615 434/247 |
| 2011/0172060 | A1* | 7/2011 | Morales | A63B 69/004 482/8 |
| 2015/0094191 | A1* | 4/2015 | Fradin | A63B 24/0062 482/8 |

* cited by examiner

INTEGRATED SYSTEM FOR BOXING AND MARTIAL ARTS-BASED GROUP COMPETITIVE TRAINING AND METHOD OF USE THE SAME

BACKGROUND OF THE INVENTION

Technical Field of the Invention

The present invention is generally in the field of training systems and more particularly in the field of boxing and martial arts-based systems, devices and methods for individual and group instruction, and competitive training.

Description of the Related Art Including Information Disclosed Under 37 CFR 1.97 and 37 CFR 1.98

The following description of the art related to the present invention refers to a number of publications and references. Discussion of such publications herein is given to provide a more complete background of the principles related to the present invention and is not to be construed as an admission that such publications are necessarily prior art for patentability determination purposes.

The prior art includes numerous apparatuses and methods designed for training boxers and martial artists, and for boxing and martial arts-based training. The most common apparatuses include, but are not limited to, punching and kicking bags of various sizes and filled with diverse materials, speed bags and other striking-premised training aids. Illustrative examples of prior art striking devices include, but are not limited to, training bags using a diversity of filler material of either gas, liquid, or a combination thereof: U.S. Pat. No. 4,527,796 by Critelli for a Method of Filing an Athletic Bag with Air and Liquid; U.S. Pat. No. 5,147,258 by Donohue for a Punching Bag Construction and Suspension; U.S. Pat. No. 5,330,403 by Kuo for an Inflatable Punching Device; and U.S. Pat. App. Publ. 2008/0096733 by Epstein for a Liquid Fillable Heavy Training Bag.

The prior art also includes suspended training aids, as described and claimed by U.S. Pat. No. D636036; metallic structures that facilitate the suspension of boxing training bags (U.S. Pat. No. 4,721,302); and multifunctional apparatuses that can be used to train for boxing, general physical fitness, as well as other sports disciplines (U.S. Pat. App. Publ. 20070259764).

The prior art further includes many instances that illustrate the use of various structures to support several boxing training bags simultaneously. An example of such a system is U.S. Pat. App. Publ. No. 20066194675. Structures that suspend training machines are also known.

Further, there are arrangements of the prior art that include some additional elements described and claimed in the present application. For example, U.S. Pat. No. 9,084,924 to Jones, et al., describes an interactive method for boxing and martial arts. The Jones' system includes outputting a media item on a display, a sensor(s) detection of spatial movement of a hit by a pad, and displaying the sequential punch or kick output.

U.S. Pat. No. 61/708,660 to Fradin, describes a PunchingBag Force Measures ent System that is described as a device designed to quantitatively measure the impact forces experienced by a conventional punching bag when hit by the first or foot of an individual during a workout.

The prior art also includes systems that provide limited feedback to the user when doing certain movements at the rhythm of the music following a pattern established in a screen. For example, the popular game "guitar hero" and other video games affords the user that kind of limited experience. However, those and similar video games do not focus on: (1) boxing and martial arts-based physical training; or (2) combining such training being performed by the user (individual or group) with inter-user competition.

The prior art, however, is devoid of an integrated system that allows boxing and kick-boxing-based competitive training comprising data gathering, registration and monitoring of users' identity and activities, impact receiving means, sensors integrated within the impact receivers, connectivity between the sensors and displaying means, data gathering maintenance and reporting means, software capable of receiving, maintaining, processing, interpreting and reporting information received from the sensors and a microcontroller comprising an interphase Wi Fi system capable of producing reports of the user's activity. As it will be set forth in this application, the system of the present invention comprises numerous elements and steps not available in the prior art either alone or in combination.

The devices of the prior art listed above are designed mainly for individual training. However, as described and claimed in the present application, training devices can be combined and additional elements can be incorporated to provide for a system and method to impart physical fitness group classes and fitness competitions (both on site and remotely). The elements of such a system must be uniquely combined to, among other requirements: (1) fit the needs of the users; (2) accommodate the characteristics of the sites where the competitive training is being imparted and received; (3) work within the limitations of technological tools available to provide the competitive training; and (4) suit the type of training sought and the need of the training center imparting the classes. In short, the elements of such a system must be flexible enough to fit all the needs mentioned above.

None of the devices of the prior art, however, includes (1) the means or functionality of projecting in a display means the technical movements and strikes showed by a virtual trainer that executes in real time the movements to be performed by users while synchronized at the rhythm of a musical piece following a choreographed set of movements; (2) a detailed display the scores obtained by the users so that all the participants can see the points obtained by the rest of the users in real time; or (3) a system comprising a set of structural and functional elements that allows the trainers to configure the parameters of the competition before the training or the competition starts.

BRIEF SUMMARY OF THE INVENTION

Objects, advantages and novel features, and further scope of applicability of the present invention will be set forth in part in the detailed description to follow, taken in conjunction with the accompanying drawings. The objects, advantages and novel features, and further scope of applicability of the present invention will become apparent to those skilled in the art upon examination of the following, or may be learned by practice of the invention. The objects and advantages of the invention may be realized and attained by means of the instrumentalities and combinations particularly pointed out in the appended claims.

The invention described and claimed in the present application comprises a modular and integrated system for optimal, organized, structured and integral training using boxing and martial arts-based training and conditioning tools, record keeping, integration, displaying and communication components.

The purely structural elements of an embodiment of the invention comprise a metal frame, easy to assemble and disassemble, anchored to the floor with engagement means. Boxing training bags, and other training tools can then be mounted to the frame in a pre-determined, pre-structured arrangement and array; adaptable to a variety of available space configurations and number of class participants.

Offering alternatives to participants that can engage in individual or group-training or competitive training classes is crucial in boxing or training centers with limited space and distinct commercial characteristics. So, from the pure "space availability" point of view, the most telling metric becomes the number of participants who can train in an optimal manner per a pre-determined number of square feet and time. That is due to the fact that the price per square feet of training space is a very important factor when pricing the cost of offering training, especially in densely populated areas. The system of present invention allows for assembly of the physical structure in a variety of shapes and to include different sets and numbers of participants.

The invention that the present application describes and claims vastly different and additional structural and functional elements, when compared with any of the systems of the prior art; most importantly connectivity and data gathering, management, storage and transmission capabilities. The present application discloses and claims an integrated system that gathers a few of the elements referred to above and assembles and connects them in a structural and functional new and useful manner, distinguishable from the systems of the prior art. The underlying idea is to seek and optimize a global training vision of a single participant or a group of participants in order to improve their training experience and results, and to allow individual to establish training metrics and group competition. The structural elements of the system of the present invention communicate with each other resulting in a fully integrated system.

Further, the data intake, maintenance, management and transmission elements, coupled with the displaying, connectivity; and data transmission, retrieval and reporting features of the system also allow for individual training and competitions to take place from a gym setting or remotely. The data gathering, processing, maintenance and transmission features of the present invention further allow for competition in real-time, comparative competition using stored data gathered by participants in different sites and storage and review of the stored data at a future date by the user or a trainer at the user's instance.

Current training systems for boxers or for people who use boxing training methods as a form of physical activity are built to fit the needs of individuals or a very small group of participants. Those systems are not optimized to provide competitive group or individual classes (on site or remote) supervised by a single trainer, or to provide unsupervised competitive training at the gym or away from a gym setting. It is the main objective of the invention described and claimed in the present invention to provide a new and useful competitive training system using fully integrated and connected boxing training devices and techniques and fully connected data gathering, maintenance, processing, reporting and transmitting capabilities.

Specifically, the system of the present application enables training, competition and tracking of users' performance when performing pre-programmed exercises against a strike receiving device according to the following general parameters: (1) synchronization of the users' movements and striking choreographed to the rhythm of a pre-determined musical piece; (2) following the moves and strikes shown on a video screen which enhances training coordination and technique; (3) measurement of the number of properly timed strikes and the relative force of the strikes to the strike-receiving device which enhances the users' strength and endurance; (4) conversion of the users' performance into a point system suitable for competition against herself or others; and (5) measurement of the users' performance by providing physiological metrics of exertion such as calories burned during a session.

In order to be able to follow the choreographed movements at the rhythm of the music, the impact receivers must be fixed and, unlike traditional heavy bags, cannot swing. An embodiment of the present invention uses fixed impact receivers comprising heavy bags touching the floor to impede swinging. Such an arrangement provides at least three obvious advantages: (1) a safer environment to conduct group trainings because the fixed impact receivers do not come back to the users with increased momentum; (2) the fixed impact receivers do not interfere with another user's training space; and (3) facilitates the users to train and compete at music's rhythm because they do not have to tailor their striking choreographed sequences to a moving object.

The system of the present invention further allows real time competition not only for individual users against themselves, but also between users training in the same center or among groups of users training in the same center or different centers. The competition feature of the system increases motivation and positive training results of users, while reducing training and competition attrition. Lack of loyalty to a training regime and to training centers is one of the most salient negative factors affecting the fitness market. The system of the present invention provides a new and useful way to generate loyalty through positive results, competition and results tracking and reporting.

In order to ensure that users fully capture the movements to execute, the technique to use and the rhythm to follow, the system of the present invention comprises a video feedback being projected onto a screen. Thus, the users in different locations (gyms, centers and home) can remotely and simultaneously perform the same choreographed exercises at following the same musical piece thus enabling multi-location, even global, training and competition.

The screen component of the present invention displays a model exerciser/striker performing all the choreographed and properly synchronized moves to the rhythm of the musical piece using proper technique as the training, competition session is taking place. That allows a trainer to teach and correct, or the individual user to acquire, the proper technique and striking being used as the exercise session is taking place, thus optimizing the training experience and the results for the users. If a user misses a move or strike or losses her place within the exercise choreographed sequence, the screen allows her to recoup her place within the routine very efficiently. In addition, the screen allows the users to execute the movements or strikes properly. If she gets lost or does not know how to do the exercises can look at the screen and see the details of the movement or strike that the choreographed routine requires. The screen also displays the proper technique thus reducing the instances in which an on-site trainer has to actually show the users the proper technique to use. While the system displays the proper movements and strikes on the screen, the on-site trainer (or the individual at home) can evaluate the efficiency of the users' technical performance as it compares with the proper movements and strikes being displayed on the screen. So, the use of a screen greatly enhances the teaching value of the system, and the experience and results of the user. A positive and motivating group experience also increases the users' desires to stick with the system as a training and competition tool. Further, real time synchronization of movements and strikes at the rhythm of a pre-determined musical piece provide the users a feeling of connection to other users that it is more difficult to achieve while training alone. In short, unlike other training systems, the system of the present invention creates a unique experience of inter-user connection and motivation to train and compete.

BRIEF DESCRIPTION OF THE SEVERAL VIEWS OF THE DRAWINGS

The accompanying drawings, which are incorporated into and form a part of the specification, illustrate an embodiment of the present invention and, together with the description, serve to explain the principles of the invention. The drawings are only for the purpose of illustrating a preferred embodiment of the invention and are not to be construed as limiting the invention.

DETAILED DESCRIPTION OF THE INVENTION

Figure 1:
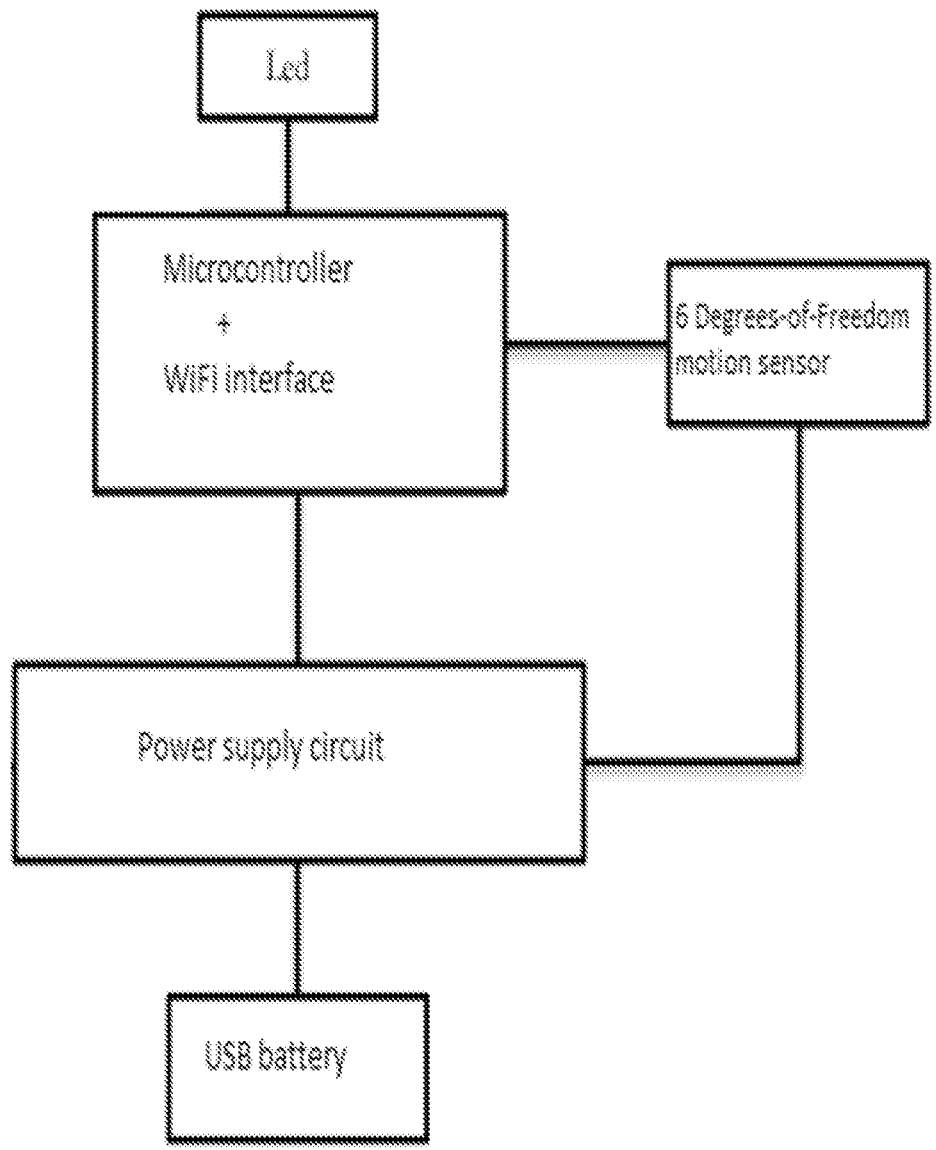
FIG. 1: a schematic illustration of the Wi-Fi Sensors including the elements it comprises and the interrelation and connection between them.

The invention of the present application comprises the listed and combined elements and components as described immediately below.

1. Registry Means: The invention's users are the participants in the training and competition services applicants offer which take place using impact receivers and can be offered individually or in groups. The first step of the method of the present invention is the registration step. The participants register in a registry means before the beginning of each session, the registry means being able to: (1) recognize individual participants; and (2) assign to each participant an impact receiver identified by a number.

The system's users use hand and shin protective gear comprising bandages, training gloves, shin guards and elbow guards to protect the areas of the participants' body that come in contact with the impact receiver and to effect the strikes safely. For data control purposes, each participant uses the pre-assigned, numbered impact receiver.

Each user observes a screen where is a video with the exercises that she must realize. The video comprises a virtual trainer who demonstrates exactly how to perform each move, strike and exercise routine following the rhythm of the musical audio playing during the demonstration. The moves comprise strikes to the impact receiver that the user must perform at the rhythm of the music. So, the music the users hear while watching the virtual training dictates the rhythm that the users must follow. That requirement forces the users to concentrate in the proper execution of the moves, strikes and routines following the proper timing. Proper execution then results in points being assigned to each user and being displayed in a screen. The sensor component measures the strength of the strikes to the impact receiver and assigns points proportionally. The higher the force of the strike to the impact receiver, the higher the points being assigned therefrom.

One of the main objects of the system of the present application is to motivate the users to engage in the training and competition by being able to see in real time the results of their performance. In addition, the system teaches the users the correct technical execution of the moves and strikes. By creating single or inter-center real time competition, the system of the present application further motivates the users. Further, that motivation, commitment and engagement increases even more because users are able to participate and compete remotely from any location, including their home.

2. Fixed Impact Receivers: the fixed impact receivers are the invention's elements that receive the users' strikes. Those impact receivers can be of different heights, thicknesses, and made with different impact-resistant materials. A suitable impact receiver comprises boxing and martial arts training devices such as punching bags and other devices capable of receiving strikes in a safe manner for the users. The users are outfitted with hand and shin protective gear comprising bandages, training gloves, shin guards and elbow guards to protect the areas of the participants' body that come in contact with the impact receiver and to effect the strikes safely.

The impact receiver is positioned vertically with respect to the user, which positioning can be achieved by diverse means comprising hanging (fixed against the floor or not), sitting on the floor or attached to a wall, depending on the type of exercise training taking place. Each fixed impact receiver is numbered in order to facilitate assignment to an identified user.

The impact receivers must be placed sufficiently apart from each other to allow users during group training or competition to safely strike them without interfering with each other (minimum distance of 1.2 meters). The system of the present invention comprises multiple configurations for the placement of multiple impact receivers. As long as each user can clearly see the screen(s), and the impact receivers' arrangement is such that the users do not interfere with each other while using the system, any geometric arrangement suitable to the available space of the impact receivers would work.

3. Wi-Fi Sensors: the Wi-Fi sensors are hardware devices capable of: (1) detecting the impact receivers' movement; (2) identifying each impact or strike; and (3) emitting an impact signal which is converted into an electronic impact file comprising information about each impact, which file is then transmitted electronically to a local server through a Wi-Fi communication protocol. Each impact receiver can comprise at least one Wi-Fi Sensor positioned preferably on the top portion of the impact receiver (outside or inside) in such a location as to not to receive direct strikes from the users.

Each Wi-Fi sensor of the present invention comprises a unique and distinct code. Because each fixed impact receiver has a different number, then each Wi-Fi sensor is individually assigned to each fixed impact receiver's number.

In an alternative embodiment of the invention, wired sensors that provide equivalent properties, characteristics and function when compared to the Wi-Fi Sensors are used instead of the wireless Wi-Fi Sensors.

The Wi-Fi Sensors comprise the following elements, interrelated and connected to each other as set forth in FIG. 1:

a. Housing: the housing is made from non-conducting material, preferably hard plastic, and contains the rest of the Wi-Fi Sensor's elements.

b. Light Emitting Diode (LED): the LED is placed visibly to the users on the Housing and signals to the users and trainers the off or on state of the Wi-Fi sensor. If the LED is red, it indicates that the source of power is low and if it is green, it indicates that the source of power is charged. If the LED is completely off, it indicates that the Wi-Fi sensor is off and is receiving no power, which, in the case of a battery power source, it might mean that the battery has no charge.

c. Micro-Controller: the Micro-Controller contains the signal management software and is connected to the accelerometer that is continuously sending acceleration data. It is also connected to the LED and it recognizes whether the Sensor is off or on and the state and level of a source of power, usually a battery.

d. Accelerometer: the accelerometer is a hardware component connected to the micro-controller and to the source of power. The accelerometer is capable of detecting the Wi-Fi sensor's movement with 6 degrees of freedom and of transmitting to the micro-controller continuous information about the Wi-Fi sensor's movement. When a user strikes the impact receiver, the Wi-Fi sensor accelerates and the accelerometer detects the acceleration. The accelerometer then sends the Wi-Fi sensor's real-time acceleration data (i.e., measured at real-time intervals) that is gathering continuously to the micro-controller.

In an alternative embodiment of the invention, the accelerometer can be fitted with a device capable of emitting a distinctive sound or light which increases or changes depending on the acceleration data value.

e. Signal Management Software: the Signal Management Software (SMS) has been designed specifically for the purposes stated in this application. It is installed in the micro-controller's hardware. The SMS receives, interprets and manages the acceleration data the accelerometer detects and sends. The SMS is capable of recognizing whether that data is due to a real blow or to any other effect. While interpreting the information it receives from the accelerometer to detect the strikes the user makes onto the impact receiver, the SMS prepares an Impact File. In the preferred embodiment of the invention, the SMS receives information from the accelerometer and using an algorithm, distinguishes real strikes from the user onto the impact receiver in real time, on the one hand, from the impact receiver bounces or any other movement (like swings) not directly related to a user strike, on the other hand. The SMS detects strikes in real time and distinguishes them from post-strike movement of the impact receiver. Once the SMS detects a strike, it creates an Impact File which comprises data related to the strike such as: (1) a Wi-Fi Sensor's Code; (2) time of strike; (3) detected acceleration; and (4) level of the source of power.

f. Wi-Fi Interface: the Wi-Fi Interface is a hardware component integrated within the Micro-Controller. It emits the Impact Files the SMS creates and sends them to a local server via a wireless Wi-Fi communication protocol.

e. Power Source Circuit: the Power Source Circuit (PSC) is a hardware component located inside the Wi-Fi Sensor's housing. The PSC is connected to the accelerometer and to the micro-controller and it provides energy to both of them. The PSC is also connected to the External Power Source (EPS), an external battery in the invention's preferred embodiment. The EPS provides energy to the PSC. So, the EPS obtains energy from the PSC and provides that energy, as necessarily adapted, to the Wi-Fi sensor, the accelerometer and to the micro-controller.

f. USB External Battery: the USB external battery is located outside the Wi-Fi sensor's housing. The USB external battery is a rechargeable battery that is connected to the Wi-Fi Sensor's PSC via a USB cable. The LED is red if the USB external battery is not charged and green when it is. The USB external battery can be charged as often as necessary using a commercially available battery charger.

4. USB External Battery Charger: it is a commercially available battery charger capably of being connected to an electricity source and of charging a single USB external battery or more than one simultaneously as required by the system's use.

5. Wi-Fi Receiver: It is an independent hardware component that is connected to a local server via a network Ethernet cable. The Wi-Fi Receiver enables a Wi-Fi network that facilitates communication between the Wi-Fi Sensors, and the Local Server creating a LAN (local area network).

6. Users' Registry Software: the users' registry software is an internet accessible software that allows the users to register before beginning training and/or competition. The users' registry software uses the internet to interface with a users' registry server which comprises users' database. Upon registering, a user obtains an impact receiver number. From that point, until the user checks out, the user's registry software assigns that impact receiver to that particular user which shows the impact receiver as "in use" in the users' registry server. Then, the users' registry server warns the Scoring Software that is loaded in the local server that a particular user is training using a particular impact receiver and adds additional registration information about the user such as name, gender, weight, height, age and even a photo of the user. The Users' registry software can be accessed from any terminal that is connected to the internet using a password or other available access security. That way, users can register into a training or competition session and reserve their impact receiver hours or days before the training or competition session starts. That reservation system prevents problems of impact receiver assignments which greatly improves the system's service to the users.

7. Users' Registry Server: the users' registry server is a hardware computer server connected through the internet to the local server and it hosts the users' registry software. It has two main functions: (1) it hosts the users' registry database; and (2) it manages a competition application that connects all users wherein it produces inter-users' rankings, organization of users' tournaments, games and competition leagues.

The users' registry server comprises two elements.

a. Users' Database: the users' database which in turn comprises the users' names, email addresses, telephone numbers, photos, nicknames, age, height, weight, gender among other personal data. The users' database also comprises users' profiles including, but not limited to, data related to the users' training, number of impact receivers' reservations each user has made, and attendance to specific training sessions organized by date and time. Each user can access her profile in the users' database using a user name and password to modify the data therein.

b. Competition Application: it is a software application that allows a single user to compete against herself, and to participate in team competition, league competition and all kinds of different competition based on a value point system which results directly from each users' performance while using the system of the present invention. The assignment of value points then allows the creation of diverse types of inter-user competition such as one-on-one, tournaments limited to a single session or a pre-programmed number of sessions or leagues where teams compete against each other over a pre-programed number of sessions or time. The competition application also creates users' rankings that can be organized by location (or country) or time (daily, weekly, monthly, etc.). The user's ranking information is also available to each user via a user name and password. That availability provides ongoing evaluation of the comparative users' performance which, in turn, provides motivation to train and compete using the system of the present invention.

8. Local Server: it is an internet connectable computer which is also connected via a network Ethernet cable to the Wi-Fi Receiver and via an HDMI cable to an Image Displaying Means. Using the internet, the local server communicates with the users' registry software, a video server and to the users' registry server. The local server comprises the video software, video archives and the scoring software. The local server coordinates the overall performance of the system of the present invention via four specific functions:

a. Receiving the impact files that the Wi-Fi sensors send out;

b. Sending the moves and strikes the users must imitate to the displaying means;

c. Synchronizing time measuring means between the Local Server time, the Wi-Fi Sensors, the Scoring Software and the Video Software;

d. Assigning and relating points to each move and strike the users make and sending them to the displaying means together with each move and strike to which the point(s) correspond;

e. Sending to the points each user receives after a training or competition session to the users' registry server; and f. Managing (storing and displaying) training and competition routine videos.

The local server is also capable of receiving, storing and transmitting the information pertinent to the participants' vital signs and statistics such as pulse, cardiac rhythm, VO2 consumption, calories spent, etc. having the possibility to integrate with commercial wearables hardware and software.

In an alternative embodiment of the invention, the server instead of being local can be mobile such as a tablet or mobile telephone. Today, those devices have sufficient memory and storage capabilities to execute the function of servers. The main advantage of using a mobile server would be to allow trainers to display the system of the present invention at different locations away from the trainer center for demonstration and commercial purposes, such as in a mall, TV studio, at home etc.

9. Video Software: the system of the present invention comprises video software capable of managing (i.e., opening and displaying) videos that are stored in the local server. In that manner, the system's users and/or trainers can select a video(s) that displays the choreographed sequences of moves and strikes that will be used for an exercise, particular training and/or competition session. The preferred embodiment of the invention comprises a video software developed on a free software module and adapted to the needs of the system. The video software of the system of the present invention allows, among other features: (1) selection of videos among a library of stored videos in the local server's drive; (2) creating reproduction lists; and (3) beginning a video or list and being able to play it in slow motion, pause it or end it at any desired point through the displaying means. The video software component of the present invention is connected to a video server that comprises video archives, so the user can download new available training and/or competition videos and store then in the local server's drive.

9. Video Archives: the video archives comprise a video catalog of the exercises to realize during a training/competition session. Each video comprises a visual display of each choreographed move and strike and musical piece which rhythm the users must follow as they perform the moves/strikes. The video archives are downloaded from the video server and stored in the local server and remain there for a period of time the sessions' trainers determine. Periodically, new videos are added to the video archives catalog so the trainers can vary the strikes and moves and the accompanying musical pieces. That keeps the training and competition sessions fresh and allow the trainers to design fresh strike and move sequences, and hence, fresh scoring patterns to keep the users motivated.

10. Scoring Software: it is installed into the local server which must comprise an installed Linux system in order to operate the scoring software. The scoring software is not available commercially and it has been developed to serve the specific scoring needs of the system of the present application. The scoring software: (1) synchronizes the different elements needed to allow real time competition including the video software, Wi-Fi sensors, local server and scoring software (2) assigns value points to each user based on the impact files it receives from the Wi-Fi sensors; (3) calculates and produces the users' points and displays them through the displaying means; (4) allows the trainers to assign an impact receiver number to a Wi-Fi sensor code so the points are correlated, catalogued and assigned to a specific fixed impact receiver number and to a specific Wi-Fi Sensor; and (5) allows the trainers to configure the scoring system to manage and handle many different types of exercise choreographed routines, scoring methods and training/competition sessions including, but not limited to the following configurations:

a) Timing Files: the trainers create a timing file for each choreographed sequence of moves and strikes represented in one exercise video archive. So, for a particular exercise, there will be a timing file with a register of each move or strike proper timing. Each exercise or choreographed sequence may have diverse duration and number of moves or strikes. In the preferred embodiment of the invention an choreographed sequence may last between 1 to 3 minutes including from 30 to 500 moves or strikes. The timing files indicate the time after the beginning of the video (time 0) when each strike or impact must occur. The scoring software then compares the times pre-set in the timing files with the time in the impact files allowing for a pre-programmed margin of error as defined by the trainers. For example, let's assume that a particular strike has a margin of error of ±150 milliseconds. Then, an impact received within 150 milliseconds before or after the time assigned for that particular impact in the timing files will receive the maximum allowable number of points assigned to that impact. It is important to highlight that for the time files and impact files to be compared, the Wi-Fi sensors, video software, scoring software and local server must comprise timing devices that are synchronized through the local server Scoring Software. The Wi-Fi sensors time synchronizes precisely with the local server time as soon as they are powered up using a Network Time Protocol (NTP). When a new video exercise starts, the video software warns the scoring software that a new exercise has started and the scoring software starts up simultaneously. Upon starting, the scoring software requests to the video software the current play time, so a Play Time Reference is created. In addition, the scoring software uses the local server time as a Local Server Time Reference that is already synchronized with the Wi-Fi sensors. Therefore, at that precise moment the scoring software can coordinate time references for all the entities: video software play time, local server time, scoring software timing files and impact files coming from Wi-Fi sensors all of which become synchronized. That synchronization allows proper real time competition.

b) Acceleration Threshold: Also, for each move or strike, the trainers establish a minimum acceleration threshold in order for the impact received by the impact receiver to count as a valid impact. Also, an impact with a measured acceleration higher than the minimum acceleration threshold can receive proportionally higher points. The acceleration thresholds can be set also depending on gender, weight, height or other user's parameters. Thus, the training and competition rewards users that exert themselves more by creating higher acceleration impacts.

In the preferred embodiment of the invention, the minimum acceleration thresholds are:
   a. Minimum: 2 G
   b. Higher acceleration for females: 4 G
   c. Higher acceleration for males: 6 G The trainers then pre-program in the scoring software how many points are assigned for a minimum acceleration impact or a higher acceleration impact for each move or strike. So, the users that produce their strike which higher acceleration while following the pre-programed rhythm receive higher scores.

In short, the scoring software allows the configuration of the following parameters for assigning scores to the users:
   a. Margin/s of error for a strike/impact to be considered a scoring strike/impact;
   b. Minimum acceleration threshold for a strike/impact to be considered a scoring strike/impact;
   c. Higher acceleration threshold that results in additional points, depending on the user's gender;
   d. Number of points assigned to a scoring strike/impact; and
   e. Number of additional points assigned to higher acceleration strike/impact.

The method of using the present invention comprises the steps set forth below in relation to the Scoring Software.

1. Configuration of the scoring software which in turn comprises the steps of:
   a. assigning a Wi-Fi sensor identification number to each impact receiver;
   b. loading the timing files into the scoring software corresponding to the videos that will be displayed in the displaying means for a particular session;
   c. configuring the parameters required for that session's scoring related to timing margins of errors and acceleration thresholds.

2. Registration of each user in the users' registry software before the training or competition session begins using the users' registry software to assign an impact receiver to each user for the specific training/competition session.

3. The registry means then sends the user's and impact receiver's information to local server's scoring software for that training/competition session including a list comprising each user's name, the impact receiver assigned to that user for the particular session, the user's nickname, picture, gender, skill level and a median of prior scores assigned to that user;

4. When a trainer or user decides to start an exercise or a training/competition session, it plays a video or a reproduction list with several videos using the video software. When the video software starts to play the first exercise it warns the scoring software that an exercise video has started.

Figure 4:
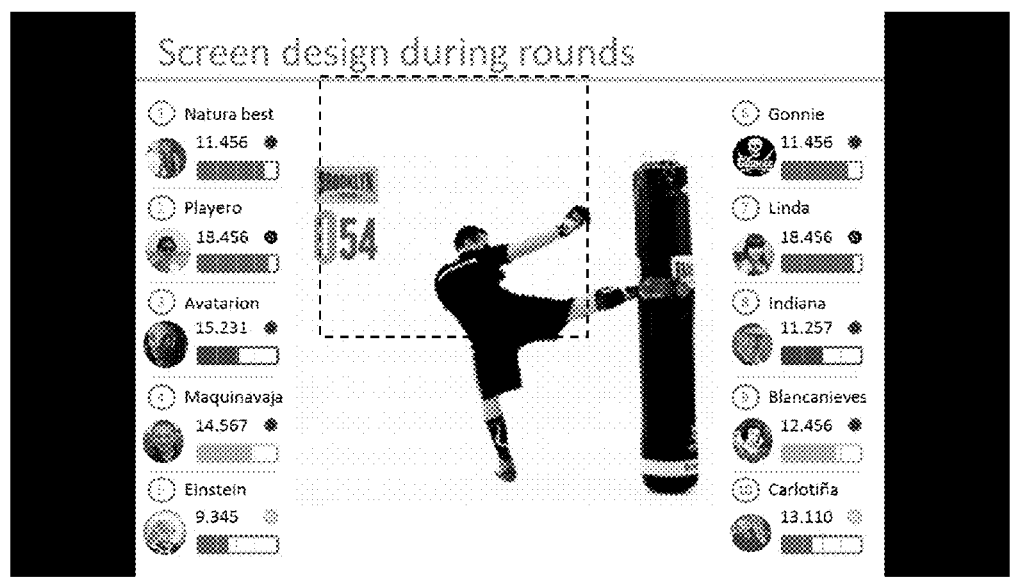
FIG. 4: is an illustration of a typical screen the displaying means shows during a session specifically showing the strike display zone in the center encased in dotted lines.

5. At that point, the Scoring Software starts to function, synchronizes with the other entities (video software, Wi-Fi sensors and local server) and gets the impact receivers' and users' information and displays the list of user's data as shown in FIG. 4.

Figure 3:
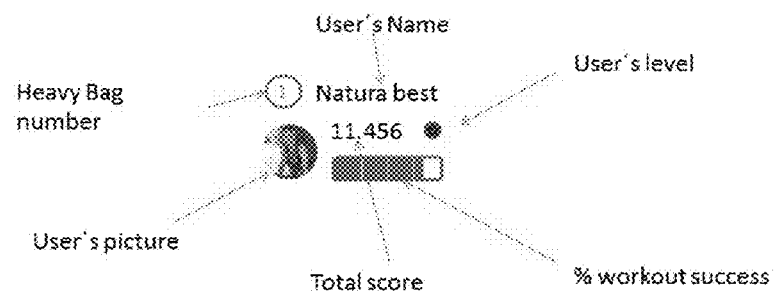
FIG. 3: illustrates a list and description of the different elements of the user's data the displaying means shows.

Information about the users who have registered for that particular session will appear on each side of the displaying screen, including the impact receiver number, nickname, picture, number of points scored, level and a performance bar. FIG. 3 describes the meaning of each of the indicators displayed for each user.

6. During the reproduction of each video displaying a choreographed sequence or exercise within a training/competition session, a model exerciser/striker will appear in the center of the displaying means performing each move or strike at the rhythm of the musical piece, and with a countdown indicating time remaining to finalize the exercise. The video software allows the display of the model exerciser/striker in the center zone of the screen as shown in FIG. 4.

7. As the choreographed move or strike is demonstratively being shown in the displaying means, each user is supposed to strike the impact receiver at the proper time. For each impact received, the impact receiver's Wi-Fi Sensors send an impact file to the local server that includes the Wi-Fi sensor's identifying number, the time at which the impact was received by the impact receiver, the acceleration of the impact and the battery charge level. So, when the local server receives an impact file, the scoring software identifies that a particular user is training or competing using a particular impact receiver so it can assign the appropriate points to the appropriate user for the specific session. The scoring software then compares the timing files with the impact files and confirms whether the timing files include an impact assigned to that time within the timing margin errors established. The times can be compared because the video software, Wi-Fi sensors, and local server and the scoring software comprise synchronized timing means. If an impact is assigned to a particular time, then the scoring software confirms the acceleration of the impact and assigns points according to the pre-programmed scoring thresholds. For example, if the impact file indicates an acceleration inferior to the minimum threshold pre-programed, then the scoring software will assign no points to that impact. If the impact file indicates an impact outside the pre-programmed timing margin of error, then the impact results in no points. The impact software of the present invention is very adaptable and can be configured to evaluate the impact files received, assign points through different avenues to facilitate the user's motivation and enjoyment of the training and competition sessions. Each time a user scores points, the scoring software send them to the displaying means, including the user's name, the impact receiver number and the user's picture. At the end of each training or competition session, the scoring software sends to the users' registry server an "end of session" file comprising all the points the user obtained in that particular session and the impacts performed therein. The users can access the users' registry server through the internet and can then appreciate the results of her training and/or her status within a particular competition session.

Figure 2:
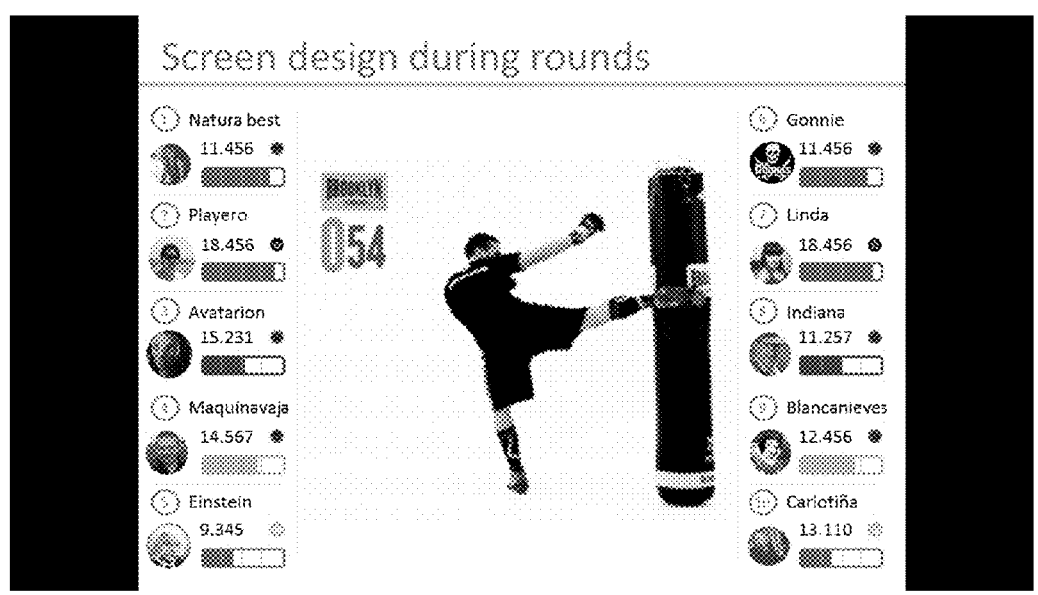
FIG. 2: a typical view of the displaying means during a training or competition session comprising a model trainer/exerciser executing a move or strike in the center of the displaying means and a list of users and users' data on the sides of the displaying means.
Figure 5:
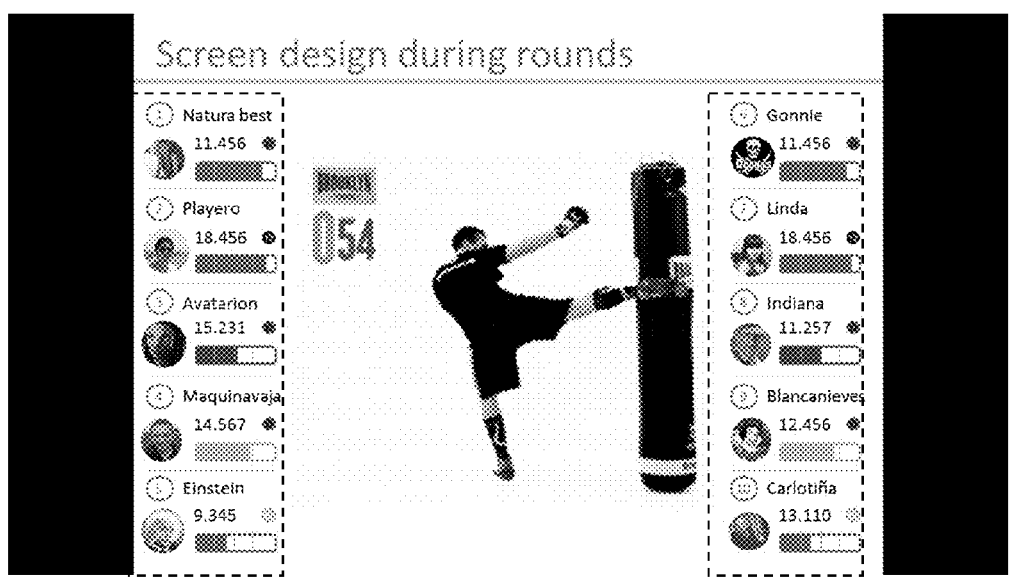
FIG. 5: is an illustration of a typical screen the displaying means shows during a session specifically showing the users display zone on each side encased in dotted lines.
Figure 6:
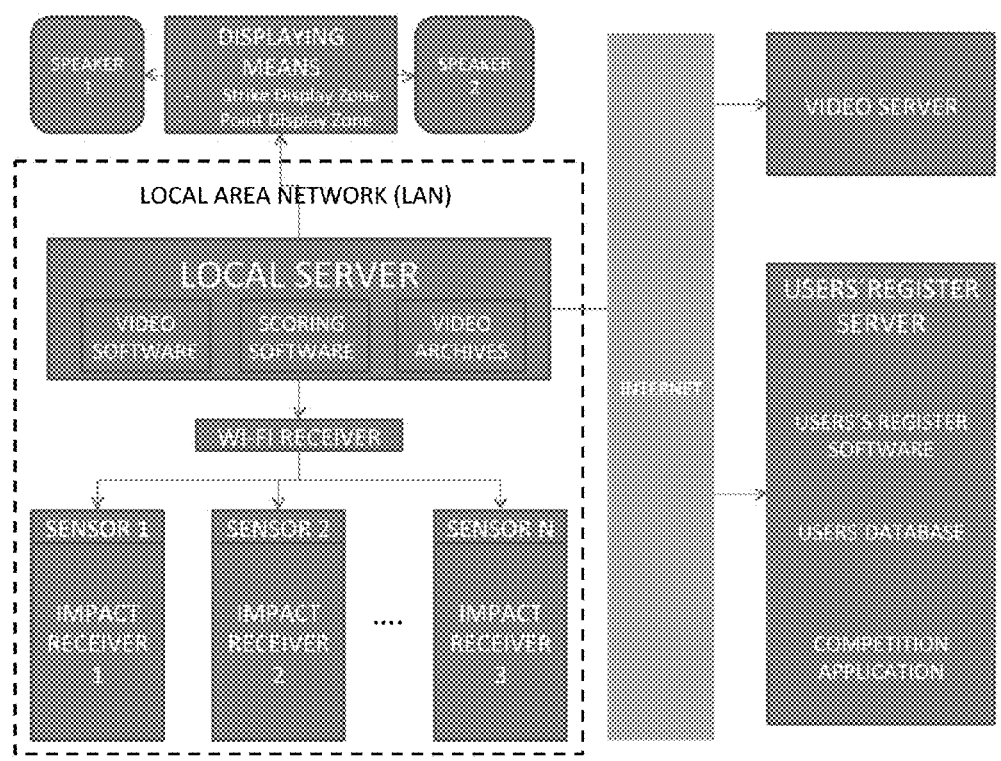
FIG. 6: is a schematic illustration of the elements of the system of the present invention and the interconnection of each element with one another.
Figure 7:
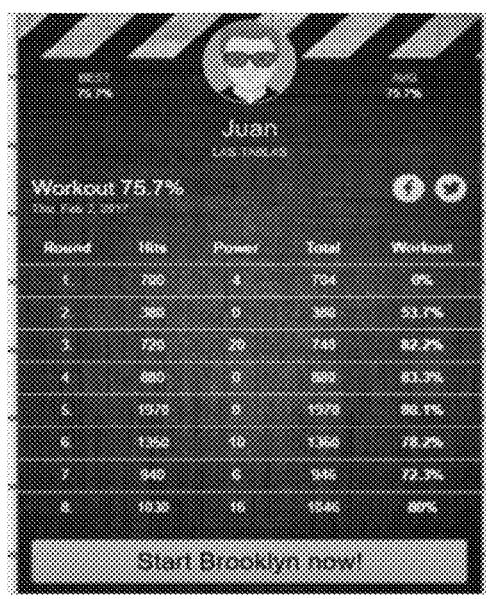
FIG. 7: is an illustration of a displaying means screen that the users would see which corresponds to the competition application software showing the results of a training/competition session, including individual points.

14. Displaying Means: can be a TV screen, a projector screen or any image receiving means capable of providing a clear visualization of the user's moves and/or impacts. The displaying means receives an image and audio signal through an HDMI cable connected to the local server. The local server, through the video software emits the video file comprising a particular move or strike in real time and through the scoring software the points each user is accumulating according to the point scoring impacts the user is performing. A typical complete screen display is showed in FIG. 2. The displaying means is divided in two display zones:

a. a move or strike display zone located generally in the center of the displaying means and illustrated with dotted lines in FIG. 4 where the moves or strikes being performed by a model exerciser/striker against the impact receiver are shown. The move or strike display zone allows the user to appreciate exactly: (1) when to initiate a particular strike onto the impact receiver to the music's rhythm; and (2) the proper execution of the move or strike. In the preferred embodiment of the invention, the displaying means also displays a chronometer that shows the time remaining to finish an exercise. The video software is the component of the present invention responsible for displaying the exercises in the move or strike display zone.

b. a point display zone located generally on each side of the displaying means and illustrated with dotted lines in FIG. 5 where the points of each user are shown. For each user, the point display zone also illustrates the impact receiver number, her nickname, points, level, performance level and photograph. The points are upgraded in real time, so the user can know at all times during a session the state of her points. The score software is the component of the present invention responsible of upgrading the users points in the points display zone and of projecting the images in the display means.

15. Speakers: the displaying means is connected to one or more speakers that allow the users to hear the musical piece required to follow the proper rhythm while executing the choreographed sequence of moves and strikes.

Figure 8:
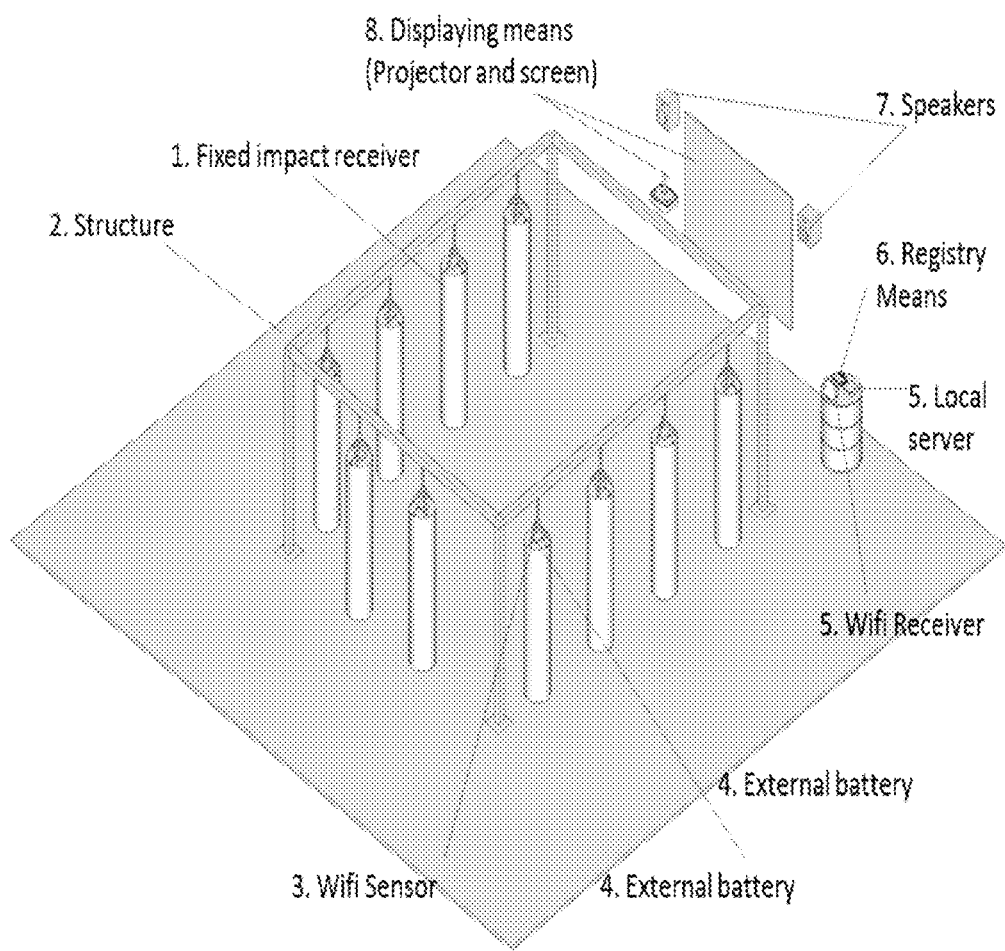
FIG. 8: is an overall illustration of the preferred embodiment of the invention showing impact receiving devices comprising sensors, a frame, Wi-Fi sensors, external batteries, a Wi-Fi receiver, a local server, registry means, speakers and displaying means.
Figure 9:
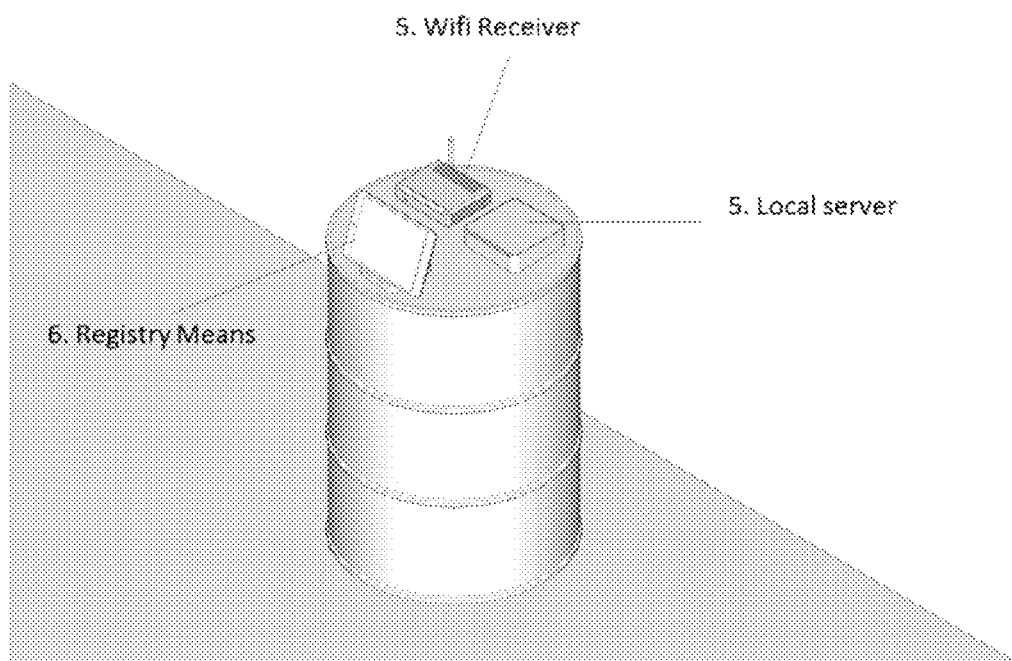
FIG. 9: is an exploded view of the top portion of the impact receivers showing the positioning of the external batteries.
Figure 10:
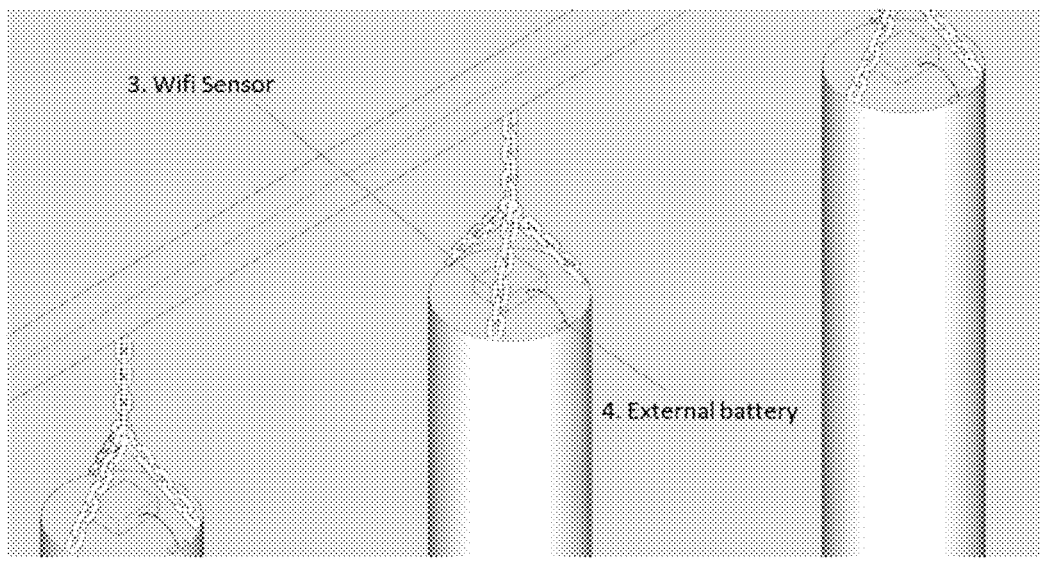
FIG. 10: is an exploded view of the positioning of the local server, registry means and Wi-Fi receiver.

FIG. 8 illustrates the elements of the system of the preferred embodiment of the present invention as they relate and are connected to each other.

What is claimed is:

1. An integrated system for boxing and martial arts-based group competitive training comprising:
   a. an electronic registry means that allows users of the system of the present invention to register as a user before the beginning of a training or competition session, the electronic registry means recognizes individual participants, assigns to each participant an impact receiver identified by an individual code and sends the user's and impact receiver's information to a local server's scoring software for each particular training or competition session including a list comprising each user's name, the impact receiver assigned to that user for the particular session, a user's nickname, the user's picture, the user's gender, a user's pre-determined skill level and a median of prior scores assigned to the user;
   b. one or more fixed impact receivers that receive the users' strikes, the impact receivers comprising a top portion and an impact portion, the fixed impact receivers being boxing and martial arts training devices such as punching bags and other devices capable of receiving strikes in a safe and ergonomic manner for the users, the fixed impact receivers being of different heights, thickness, and made with various impact-resistant materials, the impact receivers being positioned vertically with respect to the user, which positioning can be achieved by diverse means comprising hanging, fixed against a floor surface, sitting against the floor surface or attached to a wall, depending on the type of training or competition session taking place, each fixed impact receiver comprising a code to facilitate assignment to an identified user, each impact receiver being placed sufficiently apart from each other and in geometric configurations to allow users during group training or competition to safely strike them without interfering with each other while using the system;
   c. user's body protective means comprising bandages, training gloves, shin guards and elbow guards to protect the areas of the user's body that come in contact with the fixed impact receiver thus allowing the user to deliver the strikes safely;
   d. multiple Wi-Fi sensors, the Wi-Fi sensors being hardware devices that detect the impact receivers' movement, identify each user's impact or strike, and emit an impact signal which is converted into an electronic impact file comprising information about each impact, the electronic impact file being then transmitted electronically to a local server through a Wi-Fi communication protocol, with each fixed impact receiver comprising at least one Wi-Fi Sensor positioned preferably on the top portion of the impact receiver in such a location as to not to receive direct strikes from the users, the Wi-Fi sensors further comprising:
      i. a housing encasing and engaging the Wi-Fi Sensor's elements;
      ii. a source of electrical power;
      iii. a light emitting diode (LED) placed on the housing visibly to the users, the LED signaling to the users and trainers an off or on state of the Wi-Fi sensor, so if the LED is red, it indicates that a source of electrical power is low, if it is green, it indicates that the source of electrical power is charged, and if the LED is completely off, it indicates that the Wi-Fi sensor is off and is receiving no power, which, in the case of a battery power source, it might mean that the battery has no charge;

e. a micro-controller comprising a signal management software, the micro-controller being connected to an accelerometer that is continuously emitting acceleration data, the micro-controller also being connected to the LED and it recognizes whether the Wi-Fi sensor is off or on, and the state and level of the source of electrical power;

f. an accelerometer which is a hardware component connected to the micro-controller and to the source of electrical power, the accelerometer detects the Wi-Fi sensor's movement with 6 degrees of freedom and transmits to the micro-controller continuous information about the Wi-Fi sensor's movement so when a user strikes the impact receiver, the Wi-Fi sensor accelerates and the accelerometer detects the acceleration and the accelerometer then sends to the micro-controller Wi-Fi sensor's real-time acceleration data measured at real-time intervals that the accelerometer gathers continuously;

g. an in-house signal management software (SMS) designed specifically for the purposes stated in this application and installed in the micro-controller's hardware, the SMS receives, interprets and manages the acceleration data the accelerometer detects and emits, the SMS also uses an algorithm to distinguish in real time whether the accelerometer's data is due to a real user impact or to any other event such as impact receiver bouncing, swinging or any other pre-strike or post-strike movement not directly related to a user actual strike, while interpreting the information it receives from the accelerometer to detect the strikes the user makes onto the impact receiver, the SMS prepares an impact file, the impact file comprising data related to the strike such as a Wi-Fi Sensor's code, a time of strike, a detected acceleration and a level of the source of power;

h. a Wi-Fi Interface which a hardware component integrated within the micro-controller and which emits the impact files the SMS creates and sends them to the local server via a wireless Wi-Fi communication protocol;

i. a power source circuit (PSC) which is a hardware component located inside the Wi-Fi Sensor's housing and which is connected to the accelerometer and to the micro-controller thus providing electrical energy to both of them, the PSC also being connected to an external power source (EPS) which comprises an external battery in the invention's preferred embodiment, the EPS provides energy to the PSC so, the EPS obtains energy from the PSC and provides that energy, as necessarily adapted, to the Wi-Fi sensor, the accelerometer and to the micro-controller;

j. a USB external battery located outside and engaged to the Wi-Fi sensor's housing, the USB external battery being a rechargeable battery that is connected to the Wi-Fi Sensor's PSC via a USB cable so that the LED is red if the USB external battery is not charged and green when it is, the USB external battery being chargeable as often as necessary using a commercially available battery charger;

k. a USB external battery charger which is a commercially available battery charger capable of being connected to an electricity source and of charging a single USB external battery or more than one simultaneously as required by the system's use;

l. a Wi-Fi receiver which is an independent hardware component that is connected to a local server via a network Ethernet cable, the Wi-Fi Receiver enables a Wi-Fi network that facilitates communication between the Wi-Fi Sensors, and the local server creating a local area network (LAN);

m. a users' registry software which is an internet accessible software that allows the users to register before beginning training and/or competition and that uses the Internet to interface with a users' registry server which comprises a users' registry database so that upon registering, a user obtains an impact receiver number, from that point, until the user checks out, the user's registry software assigns that impact receiver to that particular user which shows the impact receiver as "in use" in the users' registry server, the users' registry server warns a scoring software that is loaded in the local server that a particular user is training using a particular impact receiver and adds additional registration information about the user, the users' registry software being accessible from any terminal that is connected to the internet using a password or other available access security so that users can register into a training or competition session and reserve their impact receiver hours or days before the training or competition session starts thus preventing problems of impact receiver assignments which greatly improves the system's service to the users;

n. a users' registry server which is a hardware computer server connected through the internet to the local server and it hosts the users' registry software, the users' registry server also hosts the users' registry database and manages a competition application that connects all users wherein it produces inter-users' rankings, organization of users' tournaments, games and competition leagues, the users' registry database comprising the users' names, email addresses, telephone numbers, photos, nicknames, age, height, weight, gender, among other personal data, and users' profiles, the users' profiles further comprising data related to the users' training, number of impact receivers, reservations each user has made, and attendance to specific training sessions organized by date and time so that each user can access her profile in the users' database using a user name and password to modify the data therein;

o. a competition application which is a software application that allows a single user to compete against herself, and to participate in team competition, league competition and all kinds of different competition based on a value point system which results directly from each users' performance while using the system of the present invention, an assignment of value points then allows the creation of diverse types of inter-user competition such as one-on-one, tournaments limited to a single session or a pre-programmed number of sessions or leagues where teams compete against each other over a pre-programed number of sessions or time, the competition application also creates users' rankings that can be organized by location and time the user's ranking information also being available to each user via a user name and password so that the user can obtain ongoing evaluation of the comparative users' performance which, in turn, provides motivation to train and compete using the system of the present invention;

p. a local server which is an internet connectable computer which is also connected via a network Ethernet cable to the Wi-Fi Receiver and via an HDMI cable to an image displaying means so that using the internet, the local server communicates with the users' registry software, a video server and to the users' registry server, the local server comprising the video software, video archives and the scoring software, the local server coordinates the overall performance of the system of the present invention via specific functions comprising:

i. receiving the impact files that the Wi-Fi sensors send out;
 ii. sending the moves and strikes the users must imitate to the displaying means;
 iii. synchronizing time measuring means between a local server time, the Wi-Fi sensors, the scoring software and a video software;
 iv. assigning and relating points to each move and strike the users make and sending them to the displaying means together with each move and strike to which the point(s) correspond;
 v. sending to the points each user receives after a training or competition session to the users' registry server; and
 vi. managing (storing and displaying) training and competition routine videos;

the local server also receives, stores and transmits information pertinent to the user's vital signs and statistics comprising pulse, cardiac rhythm, VO2 consumption and calories spent, and integrates with commercially available hardware and software;

q. a video software that opens and displays video images that are stored in the local server so that the system's users and trainers can select a video(s) that displays pre-choreographed sequences of moves and strikes that are used for an exercise, particular training or competition session, the video software having been developed on a free software module and adapted to the needs of the system, the video software of the system of the present invention allows, among other features, selection of videos among a library of stored videos in the local server's drive, creation of reproduction lists, and start of a video or list of videos and being able to play it in slow motion, pause it or end it at any desired point through the displaying means, the video software being connected to a video server that comprises video archives, so the user can download new available training or competition videos and store them in the local server's drive;

r. a set of video archives comprising a video catalog of the exercises to realize during a training or competition session, each video comprising a visual display of each pre-choreographed move and strike and a musical piece which rhythm the users must follow as they perform the moves or strikes, the video archives being downloaded from the video server and stored in the local server and remain there for a period of time the sessions' trainers determine so that periodically, new videos are added to the video archives catalog so the trainers can vary the strikes and moves and the accompanying musical pieces which keeps the training and competition sessions fresh and allow the trainers to design fresh strike and move sequences, and hence, fresh scoring patterns to keep the users motivated;

s. an in-house scoring software that is installed into the local server which comprises an installed Linux system in order to operate the scoring software, the scoring software synchronizes the different elements needed to allow real time competition such as the video software, Wi-Fi sensors, local server and scoring software, assigns value points to each user based on the impact files it receives from the Wi-Fi sensors, calculates and produces users' points and displays them through the displaying means, allows the trainers to assign an impact receiver number to a Wi-Fi sensor code so the points are correlated, catalogued and assigned to a specific fixed impact receiver number and to a specific Wi-Fi Sensor and allows the trainers to configure the scoring system to manage and handle many different types of exercise pre-choreographed routines, scoring methods and training or competition sessions, the scoring software also comprises timing files whereupon the trainers create a timing file for each pre-choreographed sequence of moves and strikes represented in one exercise video archive so that for a particular exercise, there will be a timing file with a register of each move or strike proper timing, each exercise or pre-choreographed sequence may have diverse duration and number of moves or strikes, the timing files indicate the time after the beginning of the video (time 0) when each strike or impact must occur, the scoring software then compares the times pre-set in the timing files with the time in the impact files allowing for a pre-programmed margin of error as defined by the trainers so that if a strike takes place within the pre-programmed margin of error assigned for a particular impact in the timing files, the user will then receive the maximum allowable number of points assigned to that impact;

t. multiple timing devices incorporated into the Wi-Fi sensors, the video software, the scoring software and the local server thus allowing real-time comparison of the time files and the impact files the timing devices being synchronized through the local server scoring software so that the Wi-Fi sensors time synchronizes precisely with the local server time as soon as they are powered up using a network time protocol (NTP) in such a manner that when a new video exercise starts, the video software warns the scoring software that a new exercise has started and the scoring software starts up simultaneously and requests to the video software the current play time, thus creating a play time reference, with the scoring software using a local server time as a local server time reference that is already synchronized with the Wi-Fi sensors so at that precise moment the scoring software can coordinate time references for all the elements that comprise the synchronization such as a video software play time, local server time, scoring software timing files and impact files coming from Wi-Fi sensors all of which become synchronized thus providing proper real time competition;

u. a minimum acceleration threshold the trainers create an establish for each move or strike in order for the impact received by the impact receiver to count as a valid impact so that an impact with a measured acceleration higher than the minimum acceleration threshold receives proportionally higher points, the acceleration thresholds being set based on gender, weight, height or other user's parameters resulting in higher training and competition rewards assigned to users who exert themselves more by creating higher acceleration impacts;

v. a displaying means which is an image receiving means capable of providing a clear visualization of the user's moves and/or impacts by receiving an image and audio signal through an HDMI cable connected to the local server which in turn, server, through the video software, emits a video file comprising a particular move or strike in real time and through the scoring software also issues the points each user is accumulating according to the point scoring impacts the user is performing, the image shown by the displaying means comprising:

i. a move or strike display zone located generally in the center of the displaying means which allows the user to appreciate exactly when to initiate a particular strike onto the impact receiver to the music's rhythm and the proper execution of the move or strike;

ii. a chronometer that shows the time remaining to complete an exercise; and iii. a point display zone located generally on each side of the displaying means where the points of each user are shown and that illustrates for each user the impact receiver number, the user's nickname, the points accumulated, the user's performance level and the user's picture, with the points accumulated being upgraded in real time, so the user can know at all times during a session the state of her points, with the score software being responsible of upgrading the users points in the points display zone and of projecting the images in the display means; and x. one or more speakers connected to the displaying means allowing the users to hear the musical piece required to follow the proper rhythm while executing the choreographed sequence of moves and strikes.

2. An integrated system for boxing and martial arts-based group competitive training according to claim 1 wherein the minimum distance between impact receivers is 1.2 meters.

3. An integrated system for boxing and martial arts-based group competitive training according to claim 1 wherein the housing is made from non-conducting material, preferably hard plastic.

4. An integrated system for boxing and martial arts-based group competitive training according to claim 1 wherein the additional registration information about the user the users' registry server adds comprise the user's name, gender, weight, height, age a photo.

5. An integrated system for boxing and martial arts-based group competitive training according to claim 1 wherein the minimum acceleration is equivalent to 2 G, the highest acceleration for females is 4 G and the highest acceleration for males is 6 G.

6. An integrated system for boxing and martial arts-based group competitive training according to claim 1 wherein the accelerometer can be fitted with a pressure sensor that emits a distinctive sound which level increases or changes depending on the acceleration data value the accelerometer emits.

7. An integrated system for boxing and martial arts-based group competitive training according to claim 1 wherein the Wi-Fi sensors are replaced by wired sensors that provide equivalent properties, characteristics and function when compared to the Wi-Fi Sensors.

8. An integrated system for boxing and martial arts-based group competitive training according to claim 1 wherein the local server is replaced by a smart device such as a cellular telephone, a tablet or any other device with sufficient storage capability, the ability to be connected to the Internet and which provides equivalent properties, characteristics and function when compared to the local server.

9. A method of using an integrated system for boxing and martial arts-based group competitive training, the method comprising the steps of:

a. registering users of the system before the beginning of each competitive training session using an electronic registry means which recognizes individual participants and assigns to each participant an impact receiver that receives the users' strikes, each impact receiver being identified by a number thus allowing data control, b. positioning the impact receiver vertically with respect to the user, which positioning can be achieved by diverse means depending on the type of exercise training taking place, the impact receivers' positioning including hanging while fixed against a floor surface, hanging while not fixed against the floor surface, sitting on the floor surface and attached to a wall;

c. setting multiple configurations for the placement of multiple impact receivers and placing the impact receivers sufficiently apart from each other to allow users during group training or competition to safely strike them without interfering with each other;

b. fitting the users with hand and shin protective gear selected from the group including bandages, training gloves, shin guards and elbow guards to protect the areas of the users' body that come in contact with the impact receiver and to effect strikes safely;

c. allowing each user to observe a displaying means which shows a video with the exercises that the user must realize, the video displaying a virtual trainer who demonstrates exactly how to perform choreographed moves, strikes and exercise routines following the rhythm of a pre-selected musical piece playing during the demonstration;

d. allowing each user to perform the choreographed moves, strikes and exercise routines being demonstrated at the rhythm of the musical piece being played;

e. measuring the strength of each strike to the impact receiver and assigning points using a Wi-Fi sensor, so that the higher the strike to the impact receiver, the higher the points being assigned therefrom;

f. assigning points in real time to each user based on the execution of the moves and strikes being displayed in the displaying means, so that proper synchronization between the user's moves and strikes and the moves and strikes being demonstrated in the displaying means results in points being assigned to each user which points and users are also being displayed in the displaying means;

g. using the Wi-Fi sensors positioned preferably on the top portion of each impact receiver in such a location as to not to receive direct strikes from the users, the Wi-Fi sensor emitting an impact signal to detect the impact receivers' movement and to identify each impact or strike;

h. converting the impact signals into an electronic impact file comprising information about each impact;

i. transmitting each electronic impact file electronically to a local server through a Wi-Fi communication protocol;

j. assigning a unique and distinct code to each Wi-Fi sensor and correlating the code to an impact receiver number;

k. placing a light emitting diode visibly to the users, the light emitting diode indicating the charging status of an external power source;

l. connecting a micro-controller which contains a signal management software to an accelerometer that continuously emits acceleration data;

m. connecting the micro-controller to the LED and allowing the micro-controller to recognize whether the sensor is off or on and the state and level of the source of power, usually a battery;

n. using the accelerometer to detect the Wi-Fi sensor's movement with 6 degrees of freedom and to transmit to the micro-controller continuous information about the Wi-Fi sensor's movement so when a user strikes the impact receiver, the Wi-Fi sensor accelerates and the accelerometer detects the acceleration and sends the Wi-Fi sensor's real-time acceleration data measured at real-time intervals that is gathering continuously to the micro-controller;

o. interpreting and managing the acceleration data the accelerometer detects and sends using the in-house signal management software installed in the micro-controller's hardware and which receives, interprets and manages the acceleration data the accelerometer detects and sends, the signal management software recognizes whether the data is due to a real blow or to any other effect;

p. preparing the impact file which comprises data related to the strike such as a Wi-Fi Sensor's Code, time of strike, detected acceleration and level of the source of power;

q. emitting the impact files the in-house signal management software creates and sending them to a local server via a wireless Wi-Fi communication protocol;

r. connecting the power source to the external power source, to the accelerometer and to the micro-controller;

s. charging the external battery using a commercially available battery charger and connecting it to an electricity source and to a power source circuit within the Wi-Fi Sensor using a universal serial bus cable;

t. connecting a Wi-Fi receiver to the local server via a network Ethernet cable so that the Wi-Fi receiver enables a Wi-Fi network that facilitates communication between the Wi-Fi sensors, and the local server creating a local area network;

u. using the internet to interface a users' registry software with a users' registry server so that the user's registry software assigns a particular impact receiver to a particular user which shows the impact receiver as "in use" in the users' registry server;

v. allowing the users' registry server to warn a scoring software that is loaded in the local server that a particular user is training using a particular impact receiver and adding additional registration information about the user such as name, gender, weight, height, age and a photo of the user;

x. accessing the user's registry software from any terminal that is connected to the internet using a password or other available access security so that users can register into a training or competition session and reserve their impact receiver hours or days before the training or competition session starts;

y. using the users' registry server to hosts the users' registry database and to manage a competition application that connects all users wherein it produces inter-users' rankings, organization of users' tournaments, games and competition leagues;

z. using the competition application software to allow a single user to compete against herself, and to participate in team competition, league competition and all kinds of different competition based on a value point system which results directly from each users' performance while using the system of the present invention and to create users' rankings that can be organized by location or time intervals;

aa. making the user's ranking information available to each user via a user name and password so that ongoing evaluation of the comparative users' performance becomes available;

bb. connecting the local server via a network Ethernet cable to the Wi-Fi Receiver and via an high definition multi-media interphase cable to the image displaying means so that using the internet, the local server communicates with the users' registry software, a video server and to the users' registry server and coordinates the overall performance of the system of the present invention via four specific local server functions (1) receiving the impact files that the Wi-Fi sensors send out; (2) sending the moves and strikes the users must imitate to the displaying means (3) synchronizing time measuring means between the Local Server time, the Wi-Fi Sensors, the Scoring Software and the Video Software; (4) assigning and relating points to each move and strike the users make and sending them to the displaying means together with each move and strike to which the point(s) correspond; (5) sending to the points each user receives after a training or competition session to the users' registry server; and (6) managing (storing and displaying) training and competition routine videos;

cc. using the local server to receive, store and transmit information pertinent to the participants' vital signs and statistics including pulse, cardiac rhythm, oxygen uptake (VO2) consumption and calories spent having the possibility to integrate with commercially available hardware and software;

dd. opening and displaying videos that are stored in the local server using a video software so that the system's users and/or trainers can select a video(s) that displays the choreographed sequences of moves and strikes that will be used for an exercise, particular training and/or competition session and using the video software to allow (1) selection of videos among a library of stored videos in the local server's drive; (2) creating reproduction lists; and (3) beginning a video or list and being able to play it in slow motion, pause it or end it at any desired point through the displaying means;

ee. connecting the video software to the video server that comprises video archives, so the user can download new available training and/or competition videos and store then in the local server's drive;

ff. downloading the video archives from the video server and storing them in the local server;

gg. adding new videos to the video archives catalog so the trainers can vary the strikes and moves and the accompanying musical pieces;

hh. installing a the scoring software into the local server which must comprise an installed Linux system in order to operate the scoring software, the scoring software being developed to serve the specific scoring needs of the system;

ii. using the scoring software to (1) synchronize the different elements needed to allow real time competition including the video software, Wi-Fi sensors, local server and scoring software; (2) assign value points to each user based on the impact files it receives from the Wi-Fi sensors; (3) calculate and produces the users' points and displays them through the displaying means; (4) allow the trainers to assign an impact receiver number to a Wi-Fi sensor code so the points are correlated, catalogued and assigned to a specific fixed impact receiver number and to a specific Wi-Fi Sensor; and (5) allow the trainers to configure the scoring system software to manage and handle many different types of exercise choreographed routines, scoring methods and training/competition sessions including, but not limited to the following configurations:

jj. creating a timing file for each choreographed sequence of moves and strikes represented in one exercise video archive, so, for a particular exercise, there will be the timing file with a register of each move or strike proper timing so the timing files indicate the time after the beginning of the video (time 0) when each strike or impact must occur;

kk. allowing the scoring software to compare the times pre-set in the timing files with the time in the impact files thus allowing for a pre-programmed margin of error as defined by the trainers;

ll. comparing the time files and impact files using timing devices in the Wi-Fi sensors, video software, scoring software and local server the timing devices being synchronized through the local server Scoring Software;

mm. synchronizing the Wi-Fi sensors time precisely with the local server time as soon as they are powered up using a Network Time Protocol (NTP) so when a new video exercise starts, the video software warns the scoring software that a new exercise has started and the scoring software starts up simultaneously;

nn. upon starting, allowing the scoring software to request to the video software the current play time, so a Play Time Reference can be created;

oo. allowing the scoring software to use the local server time as a Local Server Time Reference that is already synchronized with the Wi-Fi sensors so that at that precise moment the scoring software can coordinate time references for all the entities: video software play time, local server time, scoring software timing files and impact files coming from Wi-Fi sensors all of which become synchronized thus allowing that synchronization to result in proper real time competition;

pp. establishing a minimum acceleration threshold in order for the impact received by the impact receiver to count as a valid impact so that an impact with a measured acceleration higher than the minimum acceleration threshold can receive proportionally higher points;

qq. using the scoring software to configure the following parameters for assigning scores to the users (1) timing margin/s of error for a strike/impact to be considered a synchronized scoring strike/impact; (2) minimum acceleration threshold for a strike/impact to be considered a scoring strike/impact; (3) higher acceleration threshold that results in additional points, depending on the user's gender or other parameters; (4) number of points assigned to a scoring strike/impact; and (5) number of additional points assigned to higher acceleration strike/impact;

rr. using the image displaying means to receive an image and audio signal through an HDMI cable connected to the local server which, through the video software emits the video file comprising a particular move or strike in real time and through the scoring software the points each user is accumulating according to the point scoring impacts the user is performing;

ss. using a move or strike display zone to allow the user to appreciate exactly: (1) when to initiate a particular strike onto the impact receiver to the music's rhythm; and (2) the proper execution of the move or strike; wherein the displaying means also displays a chronometer that shows the time remaining to finish an exercise;

tt. using a point display zone located generally on each side of the displaying means to show the points of each user so that for each user, the point display zone also illustrates the impact receiver number, her nickname, points, level, performance level and photograph with the points upgraded in real time, so the user can know at all times during a session the state of her points;

uu. using the scoring software to upgrade the users points in the points display zone and to project the images in the display means; and vv. connecting the image displaying means to one or more speakers that allow the users to hear the musical piece required to follow the proper rhythm while executing the choreographed sequence of moves and strikes.

10. An integrated system for boxing and martial arts-based group competitive training according to claim 9 wherein the points assigned in real-time to each user based on the execution of the moves can also be stored in the local server and be available for review by trainers and users at a later time.

* * * * *